United States Patent
Lortz

(10) Patent No.: US 8,849,674 B2
(45) Date of Patent: Sep. 30, 2014

(54) VOICE INTERFACE TO NFC APPLICATIONS

(71) Applicant: Intel Corporation, Santa Clara, CA (US)

(72) Inventor: Victor B. Lortz, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/756,749

(22) Filed: Feb. 1, 2013

(65) Prior Publication Data

US 2013/0144628 A1 Jun. 6, 2013

Related U.S. Application Data

(63) Continuation of application No. 11/647,001, filed on Dec. 28, 2006, now Pat. No. 8,386,259.

(51) Int. Cl.
*G10L 21/00* (2013.01)
*G10L 25/00* (2013.01)

(52) U.S. Cl.
USPC .......... 704/275; 704/270; 379/910; 455/41.1; 455/3.05

(58) Field of Classification Search
USPC ............... 704/270, 270.1, 275; 379/900, 907, 379/910; 455/563, 41.1, 3.05; 255/462.46
See application file for complete search history.

(56) References Cited

U.S. PATENT DOCUMENTS

| | | | |
|---|---|---|---|
| 5,915,001 | A | 6/1999 | Uppaluru |
| 6,532,446 | B1 | 3/2003 | King |
| 6,732,078 | B1 | 5/2004 | Luomi et al. |
| 7,030,761 | B2 * | 4/2006 | Bridgelall et al. ......... 340/572.2 |
| 7,409,229 | B2 | 8/2008 | Choi |
| 7,669,149 | B2 | 2/2010 | Dietl et al. |
| 7,818,178 | B2 | 10/2010 | Overend et al. |
| 8,335,493 | B2 * | 12/2012 | Angelhag .................. 455/414.1 |

(Continued)

FOREIGN PATENT DOCUMENTS

| CN | 1298249 A | 6/2001 |
|---|---|---|
| CN | 1578513 A | 2/2005 |

(Continued)

OTHER PUBLICATIONS

Decision to Grant received for Chinese Patent Application No. 200710306289.X, mailed Sep. 26, 2012, 2 pages of Chinese Decision to Grant and 2 pages of unofficial English translation.

(Continued)

*Primary Examiner* — Shaun Roberts
(74) *Attorney, Agent, or Firm* — Barnes & Thornburg LLP

(57) ABSTRACT

Technologies for transferring Near Field Communications information on a computing device include storing information corresponding to services in a database on the computing device, receiving a voice input corresponding to a name of a requested service, and retrieving the information corresponding to the requested service from the database. Such technologies may also include loading the retrieved information corresponding to the requested service into a Near Field Communications tag emulated by the computing device and transferring the retrieved information to a portable computing device in response to the Near Field Communications tag being touched by a Near Field Communications reader of the portable computing device. The information corresponding to the requested service stored in the database, retrieved from the database, loaded into the Near Field Communications tag, and/or transferred to the portable computing device may include a Universal Resource Identifier and content-specific keywords corresponding to the requested service.

17 Claims, 5 Drawing Sheets

(56) References Cited

U.S. PATENT DOCUMENTS

| | | | |
|---|---|---|---|
| 8,386,259 B2 | 2/2013 | Lortz | |
| 2003/0095525 A1 | 5/2003 | Lavin et al. | |
| 2004/0138781 A1 | 7/2004 | Sacks et al. | |
| 2006/0052055 A1* | 3/2006 | Rowse et al. | 455/41.1 |
| 2006/0094405 A1* | 5/2006 | Dupont | 455/414.1 |
| 2006/0118622 A1* | 6/2006 | Zatloukal et al. | 235/382 |
| 2006/0148404 A1 | 7/2006 | Wakim | |
| 2006/0229881 A1* | 10/2006 | Tsai | 704/275 |
| 2007/0235539 A1* | 10/2007 | Sevanto et al. | 235/451 |
| 2007/0250707 A1* | 10/2007 | Noguchi | 713/164 |
| 2008/0081608 A1* | 4/2008 | Findikli et al. | 455/425 |
| 2008/0132167 A1* | 6/2008 | Bent et al. | 455/41.2 |
| 2008/0162141 A1 | 7/2008 | Lortz | |
| 2009/0075592 A1 | 3/2009 | Nystrom et al. | |

FOREIGN PATENT DOCUMENTS

| | | | |
|---|---|---|---|
| EP | 1206103 A2 | 5/2002 | |
| EP | 1496678 A2 | 1/2005 | |
| JP | 11184670 A | 7/1999 | |
| JP | 2001273226 A | 10/2001 | |
| JP | 2002183693 A | 6/2002 | |
| JP | 2003036403 A | 2/2003 | |
| JP | 2003198451 A | 7/2003 | |
| JP | 2005004782 A | 1/2005 | |
| KR | 1020030057005 A | 7/2003 | |
| WO | 2006002308 A2 | 1/2006 | |
| WO | 2006070278 A1 | 7/2006 | |

OTHER PUBLICATIONS

Intention to Grant received for European Patent Application No. 07254998.3, mailed Sep. 20, 2011, 25 pages.
Office Action received for Japanese Patent Application No. 2007-332573, mailed Jul. 27, 2010, 2 pages of Japanese Office Action and 2 pages of unofficial English translation.
Office Action received for Chinese Patent Application No. 200710306289.X, mailed Sep. 18, 2009, 7 pages of Chinese Office Action and 6 pages of unofficial English translation.
No. Office Action received for Chinese Patent Application No. 200710306289.X, mailed Jul. 5, 2011, 7 pages of Chinese Office Action and 7 pages of unofficial English translation.
Office Action received for Chinese Patent Application No. 200710306289.X, mailed Apr. 16, 2012, 3 pages of Chinese Office Action and 2 pages of unofficial English summary translation.
Extended European Search Report received for European Patent App. No. 07254998.3, mailed Aug. 6, 2010, 7 pages.
Extended European Search Report received for European Patent App. No. 12001475.8, mailed Jul. 20, 2012, 4 pages.
Want "An Introduction to RFID Technology" Persuasive Computing, IEEE vol. 5 Issue 1, Jan.-Mar. 2006 IEEE, 9 pages.
NFC Forum, Inc., "Smart Poster Record Type Definition," Technical Specification, SPR 1.1, NFCForum—SmartPoster_RTD_1.0, Jul. 24, 2006, 15 pages.
NFC Forum, Inc., "Text Record Type Definition," Technical Specification, RTD-TEXT 1.0, NFCForum—TS-RTDText_1.0, Jul. 24, 2006, 10 pages.
NFC Forum, Inc., "URI Record Type Definition," Technical Specification, RTD-URI 1.0, NFCForum—TS-RT_URI_1.0, Jul. 24, 2006, 14 pages.
NFC Forum, Inc., "NFC Data Exchange Format (NDEF)," Technical Specification, NDEF 1.0, NFCForum—TS-NDEF_1_0, Jul. 24, 2006, 25 pages.
NFC Forum, Inc., "NFC Record Type Definition (RTD)," Technical Specification, RTD 1.0, NFCForum—TS-RTD_1.0, Jul. 24, 2006, 20 pages.
Koninklijke Philips Electronics N.V., "Come closer, go further," 2004-2006, http://www.usa.philips.com/mt_theme_2006_07_nfc_large.html, 2 pages.
Office Action received for Chinese Patent Application No. 201210531829.5, mailed Feb. 19, 2014, 5 pages of Chinese Office Action and 5 pages of unofficial English translation.

* cited by examiner

VOICE INTERFACE TO NFC APPLICATIONS

CROSS-REFERENCE TO RELATED U.S. PATENT APPLICATION

This application is a continuation application of U.S. application Ser. No. 11/647,001, entitled "VOICE INTERFACE TO NFC APPLICATIONS," filed on Dec. 28, 2006 and now U.S. Pat. No. 8,386,259.

BACKGROUND OF THE INVENTION

1. Field of the Invention

The present invention is generally related to near field communications (NFC). More particularly, the present invention is related to a voice interface to NFC applications.

2. Description

Near-Field Communications (NFC) is a very short-range contactless data transfer technology related to RFID (Radio Frequency Identification). NFC has achieved commercial success in Europe and Japan for public transit payment systems and for point-of-sale purchases using cell phones with built-in NFC interfaces.

Another NFC application that has been proposed and deployed to a limited extent is to store URIs (Universal Resource Identifiers) in NFC tags attached to Smart Posters. Users with NFC-equipped cell phones can scan the NFC tag on a Smart Poster to automatically call up web content associated with the poster on their cell phones. This eliminates the need to manually enter a URI on a device with a limited keypad. However, Smart Poster scenarios typically presume that the user intends to immediately use the URI. What is not considered is the problem of retrieving or managing multiple such URIs on the portable device.

Speech recognition is another possible technology that could be used for entering web addresses on limited user interface devices. However, considering how awkward it is to verbally communicate most URIs to another person, it is clear that speech recognition technology will have to become very sophisticated before it can be used for this purpose. Accurate speech recognition requires a large number of MIPS (million instructions per second), which is problematic for low power portable devices. Furthermore, even if the recognition engine worked perfectly, insurmountable usability obstacles surround the problem of verbally entering typical URIs such as, for example, http://www!ncbi!nlm!nih!gov/entrez/query!fcqi?cmd=Retrieve&db=PubMed&list_uids=9962543&dopt=Abstract. (It should be noted that periods have been replaced with exclamation marks in the above referenced URI to avoid inadvertent hyperlinks.)

Thus, what is needed is a technique for combining speech recognition with NFC to enable a user to enter and use web addresses on portable devices.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention enable a portable device to process URIs (Universal Resource Identifiers), as well as the web content to which the URI (Universal Resource Identifier) refers to, in an efficient manner using NFC and voice recognition technology. This is accomplished using a portable (i.e., mobile) device that includes a NFC reader, an audio input interface, and a voice recognition system. The NFC reader may be used to read URIs from "Smart Posters" and other objects in which NFC tags are located. The audio input interface may be used to further annotate the URIs retrieved by the NFC reader with user-defined keywords for managing stored URIs. The audio input interface may also be used in conjunction with the voice recognition system as a voice assisted lookup mechanism for retrieving stored URIs.

Embodiments of the present invention provide a flexible framework for combining voice recognition with NFC. This enables devices with limited user interface (UI) capabilities to more easily navigate and use Internet content. Embodiments of the present invention also extend a portable device's command vocabulary through meta-data associated with the URIs obtained via the NFC reader.

Figure 1:
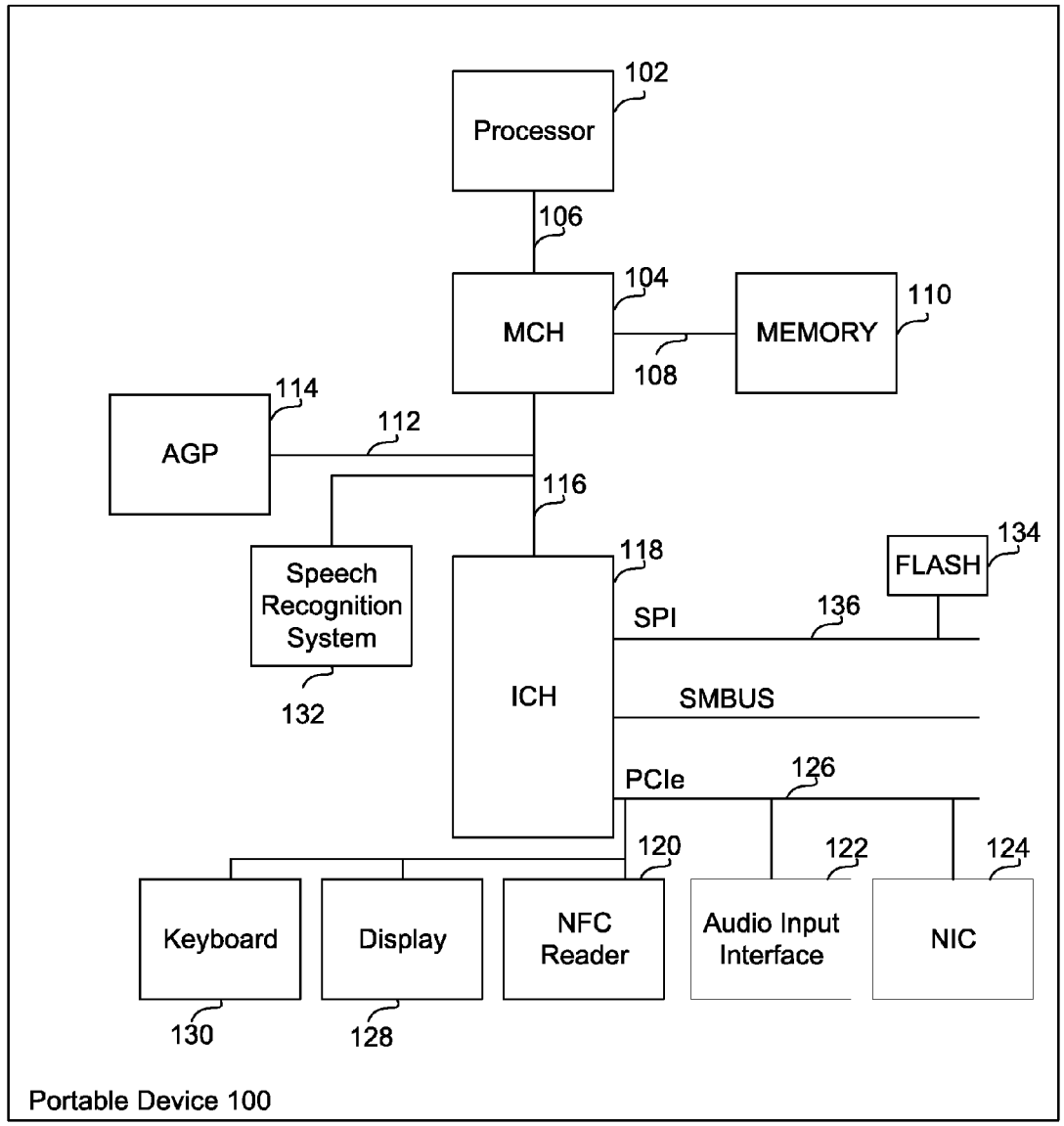
FIG. 1 is a block diagram illustrating an exemplary platform topology of a portable device according to an embodiment of the present invention.

Embodiments of the present invention may be implemented using hardware, software, or a combination thereof and may be implemented in one or more multi-core processor platforms or single-core processing systems. FIG. 1 illustrates an exemplary platform topology of a portable device 100 according to an embodiment of the present invention. Various embodiments are described in terms of this exemplary platform topology. After reading this description, it will be apparent to a person skilled in the relevant art(s) how to implement the invention using other platform topologies and/or other computer architectures.

Portable device 100 comprises a processor 102. As previously indicated, processor 102 may be a single core, a dual core, a quad core, or a multi-core processor. Processor 102 may be an Intel® Pentium® M processor manufactured by Intel® Corporation, located in Santa Clara, Calif., or any other type of processors capable of carrying out the methods disclosed herein, such as, for example, an Intel® Core™ Solo processor, an Intel® Core™ Duo processor, etc., each manufactured by Intel® Corporation. Processor 102 may include multiple threads as well.

Processor 102 may communicate with a memory controller hub (MCH) 104, also known as a North bridge, via a front side bus 106. MCH 104 communicates with system memory 110 via a memory bus 108. Memory 110 may be a hard disk, a floppy disk, random access memory (RAM), read only memory (ROM), flash memory, or any other type of medium readable by processor 102. Memory 110 may store instructions for performing the execution of method embodiments of the present invention. Memory 110 may also store each URI and its associated data that is captured using portable device 100. MCH 104 may also communicate with an advanced graphics port (AGP) 114 via a graphics bus 112.

MCH 104 may communicate with an I/O controller hub (ICH) 118, also known as a South bridge, via a peripheral component interconnect (PCI) bus 116. ICH 118 may be coupled to one or more I/O (Input/Output) component devices, such as, but not limited to, a NFC reader 120, an audio input interface 122, a network interface controller (NIC) 124 via a PCI bus 126, a display 128 for displaying web content as well as other information, and a keyboard 130. In many instances, keyboard 130 may be a limited user interface (UI). Other types of I/O components may also be used as well.

NFC reader 120 of portable device 100 may be used for URI input. For example, NFC reader 120 may be used to obtain information about an object, event, advertisement, etc. from, for example, a Smart Poster or any other object having information attached onto a NFC tag. When a user touches the NFC tag with NFC reader 120 of portable device 100, information, such as, for example, a URI, may be read by NFC reader 120. In one embodiment, keywords specific to the content of the object, for example, the Smart Poster, in which the URI is obtained, may also be read by NFC reader 120 and used as default keywords when storing and retrieving the URI. In an embodiment in which portable device 100 has wireless Internet capabilities, when NFC reader 120 of portable device 100 touches an NFC tag from a Smart Poster or other object having information attached onto the NFC tag, a web browser window may open on display 128 and portable device 100 may connect to the Internet to download the data associated with the URI read by NFC reader 120.

Audio input interface 122 may be used for classification and retrieval purposes. For example, after a URI is read by portable device 100 via NFC reader 120, the user may augment the default keywords that are obtained from the NFC tag through audio input interface 122 by inputting user-defined keywords via audio input interface 122.

Portable device 100 further comprises a speech recognition system 132 (shown in phantom). Speech recognition system 132 may be implemented in hardware, software, or a combination thereof. If speech recognition system 132 is implemented in hardware, speech recognition system 132 may be coupled to MCH 104 via PCI bus 116. If speech recognition system 132 is implemented in software, speech recognition system 132 may be found in memory 110 (not shown). Speech recognition system 132 may be used to search and retrieve URIs based on voice input received from audio input interface 122. Speech recognition accuracy and efficiency improves dramatically when applied to limited-vocabulary domains. In one embodiment of the present invention, speech recognition system 132 may use limited vocabulary domains such as command-driven menus and keyword-based lookup.

Nonvolatile memory, such as a Flash memory 134, may be coupled to ICH 118 via a SPI (System Parallel Interface) bus 136. In embodiments of the present invention, BIOS firmware may reside in Flash memory 134 and at boot up of the platform, instructions stored on Flash memory 134 may be executed. In an embodiment, Flash memory 134 may also store instructions for performing the execution of method embodiments described herein. In one embodiment, speech recognition system 132 may be implemented in software stored in Flash memory 134. In this instance, speech recognition system 132 may be initialized during system boot up of the platform when portable device 100 is turned on.

As previously indicated, embodiments of the present invention perform the complex and error-prone task of URI input on a portable device using a NFC interface combined with an audio interface and a speech recognition system. Rather than having a user enter the entire URI via voice, the user may enter the URI via NFC and optionally enter user-defined keywords via the voice input interface that may be used to retrieve and manipulate data associated with the URI.

Figure 2:
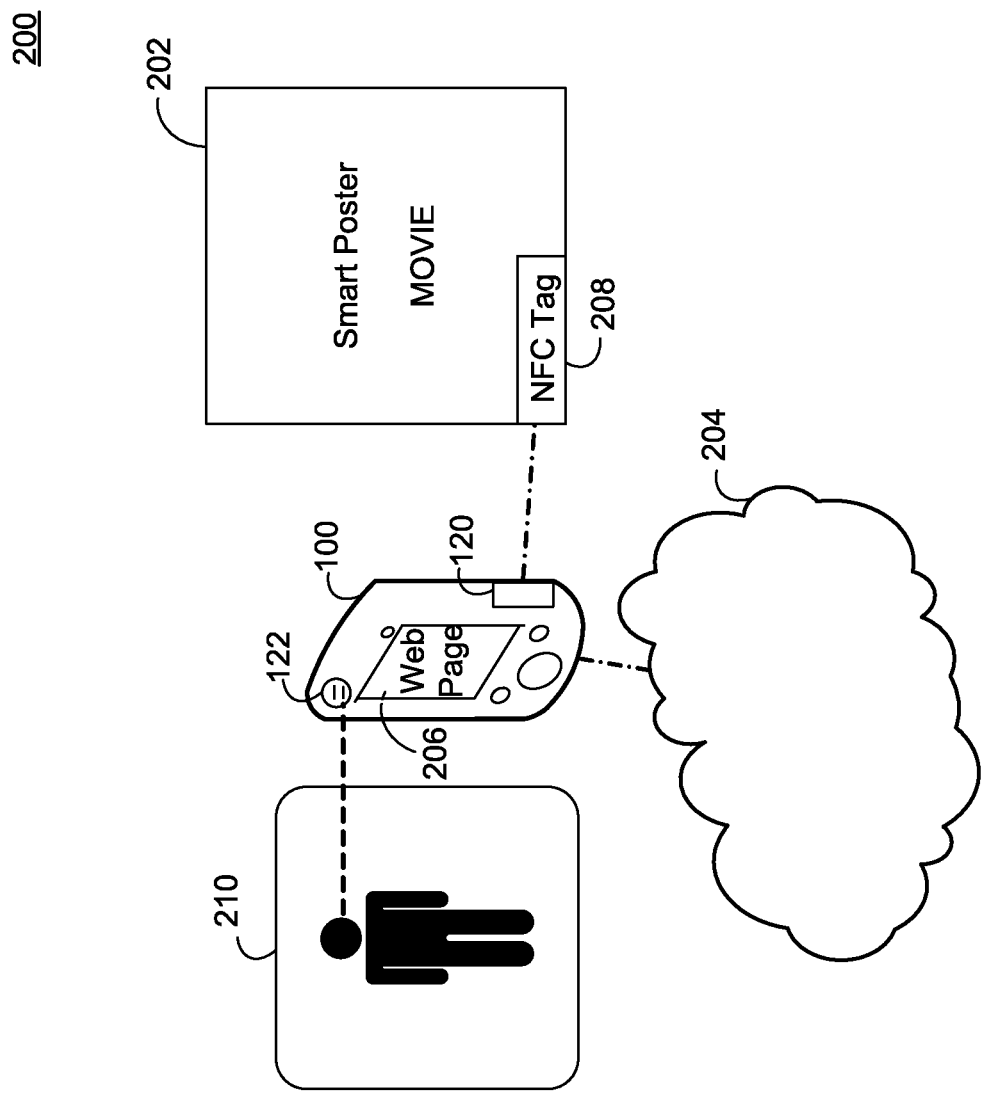
FIG. 2 is a block diagram illustrating an exemplary system for combining speech recognition and NFC to enable a user to enter and use web addresses on portable devices according to an embodiment of the present invention.

FIG. 2 is a block diagram illustrating an exemplary system 200 for combining speech recognition and NFC to enable a user to enter and use web addresses on portable devices according to an embodiment of the present invention. System 200 comprises portable device 100, a Smart Poster 202 of a movie presently be shown at the theatre, a network, such as, for example, Internet 204, and a Web page 206. Smart Poster 202 includes a NFC tag 208 containing a URI associated with advertised movie. As indicated above, portable device 100 includes NFC reader 120, audio input interface 122, and speech recognition system 132 (not explicitly shown).

A user 210, interested in attending the advertised movie on Smart Poster 202, enables NFC reader 120 of portable device 100 to touch NFC tag 208 to read the URI and associated default keywords into portable device 100. Associated keywords read by NFC reader 120 may be the title of the movie, local theatres and times of where and when the movie is playing, and other information about the movie. The time, date, and location of when and where the URI is captured may also be used as an annotation for the URI.

The URIs may be stored using default keywords and, if desired by the user, user-defined keywords entered by the user via the voice input interface. Once the URI is read, user 210 may verbally annotate the URI with user-defined keywords. In this example, user 210 verbally annotates the URI by saying the keyword "JoeActor" into audio input interface 122. "JoeActor" is user 210's favorite actor in the advertised movie, and therefore, will be easy for user 210 to remember when attempting to retrieve the URI at a later time.

If portable device 100 includes wireless Internet connectivity, portable device 100 may load Web page 206 associated with the URI read by NFC reader 120. In addition to the primary content on Web page 206, Web page 206 may contain meta-data encoded as an embedded XML (eXtensible Markup Language) data island. The meta-data may be used to facilitate subsequent search and selection by the user. For example, the meta-data can include a set of content links optimized to different device form factors, a small graphical icon, and a set of keywords (for lookup) that may be verbally entered using audio input interface 122.

The meta-data may also include additional voice commands tied to additional related links. These commands can help accelerate navigation of the target website. For example, if the URI includes a nearby restaurant to a theatre in which the movie is playing, voice command meta-data can point to internal links to provide a display of the menu from the nearby restaurant (that is, <Command word="menu"; link=http://www?Restaurant?com/menu/>) or directions to the restaurant (that is, <Command word="restaurantdirections"; link=http://www?Restaurant?com/map/>). The URI may also include a command for directions to the theatre (that is, <Command word="theatredirections"; link=http://www?Theatre?com/map/>). (It should be noted that periods have been replaced with question marks in the above referenced URIs to avoid inadvertent hyperlinks.) Speech recognition system 132 in portable device 100 may be temporarily augmented with such extended commands when the user selects a URI.

With embodiments of the present invention, it is not mandatory that the web content associated with the URIs captured by NFC reader 120 be viewed immediately. Simple command-oriented voice recognition processing allows the stored URIs to be retrieved and manipulated. The voice recognition system and audio input interface of the portable device together form a speech-based interface that allows the user to perform URI lookup using the default and user-defined keywords.

Figure 3:
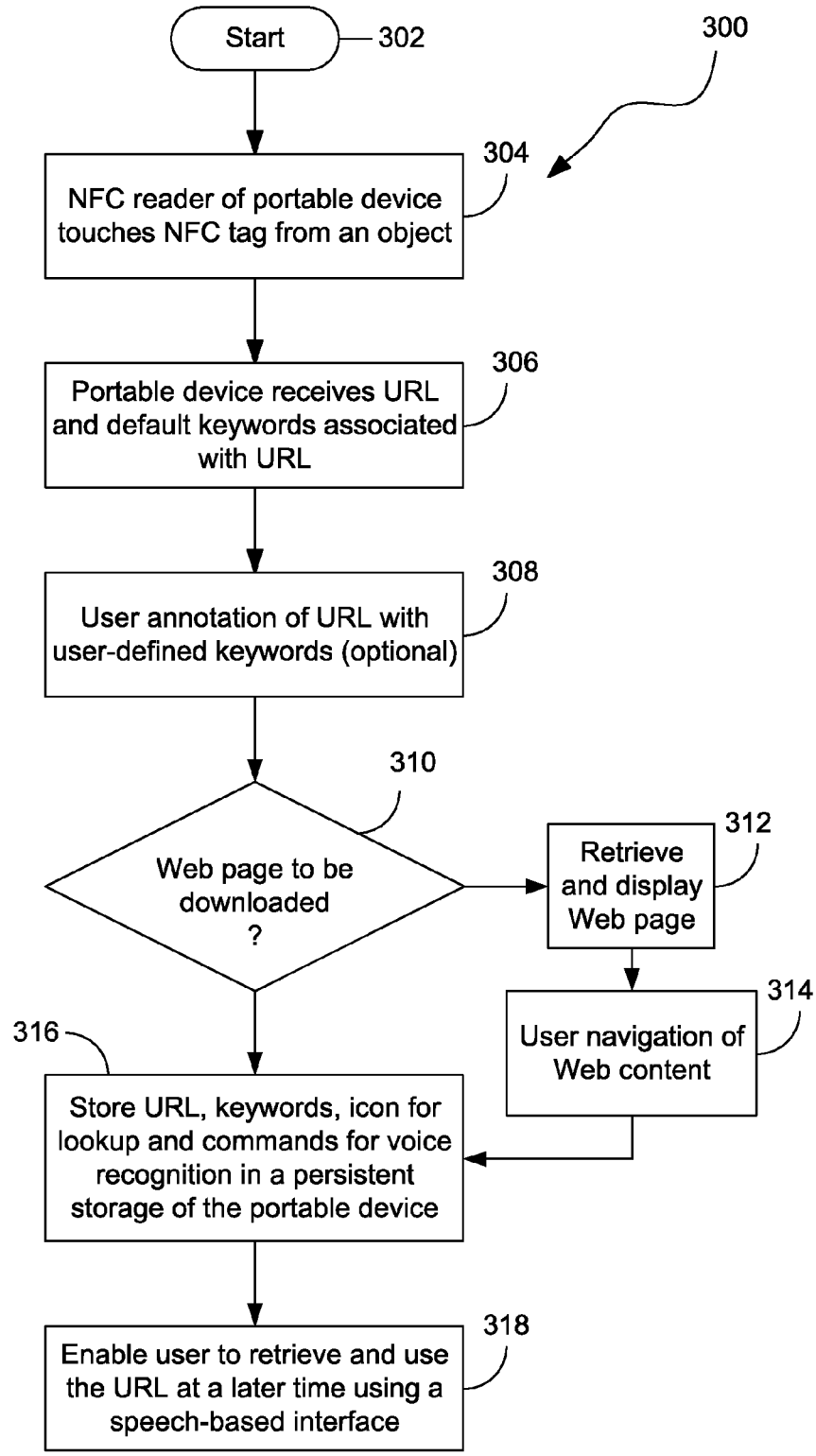
FIG. 3 is a flow diagram describing an exemplary method for enabling portable devices to navigate and use Internet content according to an embodiment of the present invention.

FIG. 3 is a flow diagram 300 describing an exemplary method for enabling portable devices to navigate and use Internet content according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins at block 302, where the process immediately proceeds to block 304.

In block 304, a NFC reader of a portable device touches a NFC tag found on an object, such as, for example, a Smart Poster. The process then proceeds to block 306.

In block 306, the portable device receives a URI and default keywords associated with the URI via the NFC reader. The process then proceeds to block 308.

In block 308, a user of the portable device may optionally annotate the URI with user-defined keywords via a voice input interface on the portable device. The process then proceeds to decision block 310.

In decision block 310, it is determined whether a Web page associated with the URI is to be downloaded and displayed on the portable device immediately. If the portable device is configured and able to connect with a server storing the Web page associated with the URI over the Internet, and the user desires to view the Web page at that time, then the portable device may retrieve and display the Web page at block 312. The process then proceeds to block 314, where the user may navigate and use the Internet content as described above with reference to FIG. 2 above. The user may also surf the Internet in a manner well known to those skilled in the relevant art(s). The process then proceeds to block 316.

Returning to decision block 310, if it is determined that the Web page associated with the URI is not to be downloaded and displayed immediately on the portable device, the process then proceeds to block 316.

In block 316, the portable device stores the URI, keywords, an icon for lookup, and commands for voice recognition in a persistent storage of the portable device. The process then proceeds to block 316.

In block 318, the user may retrieve and use the URI at a later time using the speech-based interface.

Figure 4:
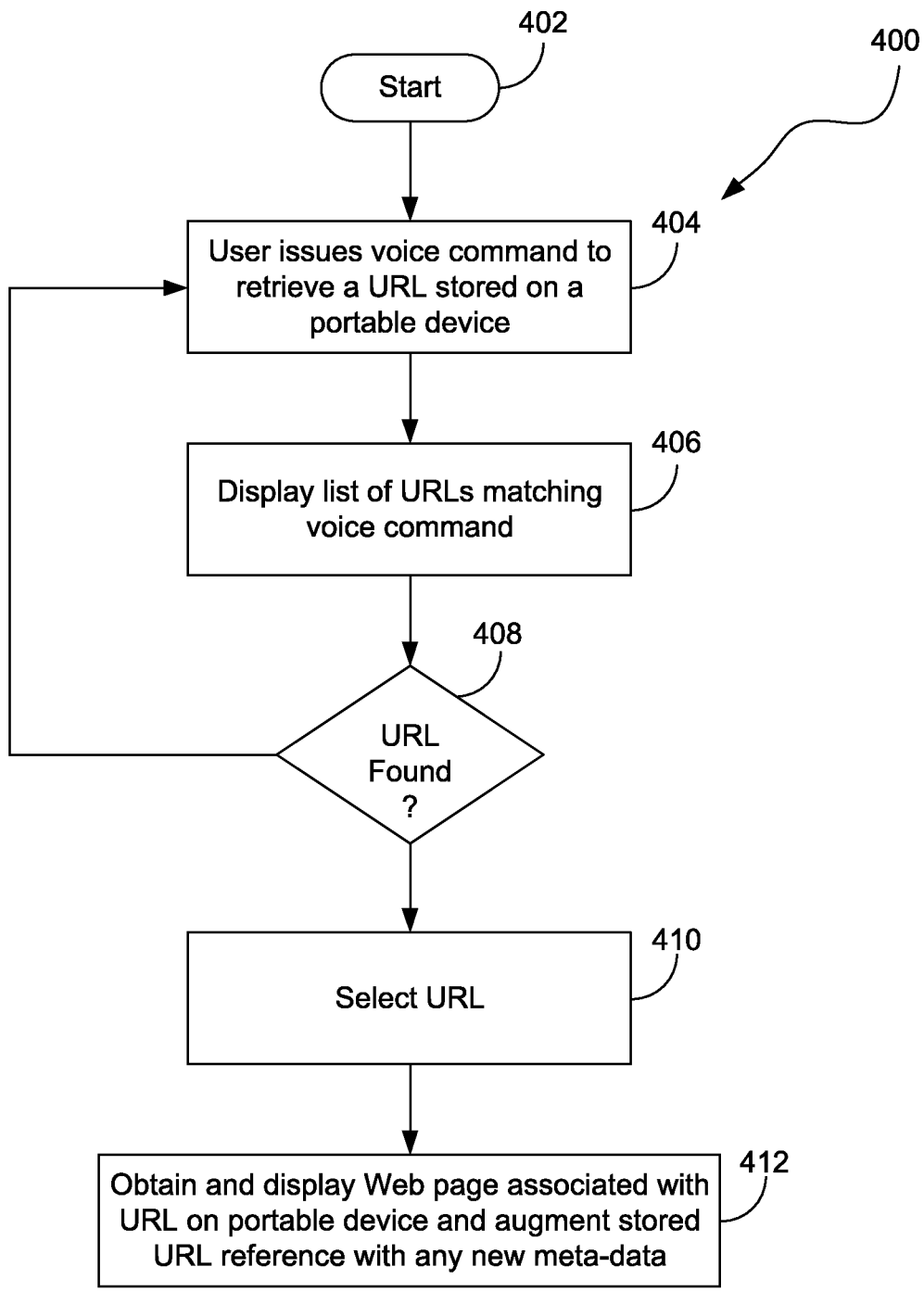
FIG. 4 is a flow diagram describing an exemplary method for retrieving and using URIs stored on a portable device via a voice input interface according to an embodiment of the present invention.

FIG. 4 is a flow diagram 400 describing an exemplary method for retrieving and using URIs stored on a portable device via a voice input interface according to an embodiment of the present invention. The invention is not limited to the embodiment described herein with respect to flow diagram 400. Rather, it will be apparent to persons skilled in the relevant art(s) after reading the teachings provided herein that other functional flow diagrams are within the scope of the invention. The process begins at block 402, where the process immediately proceeds to block 404.

In block 404, a user may issue a voice command to retrieve a URI stored in a persistent store of a portable device. For example, the user may issue the voice command "JoeActor" to retrieve all URIs related to Joe Actor that are stored on the portable device. The process then proceeds to block 406.

In block 406, representations of URIs matching the keyword "JoeActor" are displayed to the user. For example, a graphical icon and a short title for each URI matching the keyword "JoeActor" may be displayed. Other information associated with the URIs when they were originally acquired, such as keywords, time/date/location, etc. may also be displayed to aid the user in selecting the desired URI. The process then proceeds to decision block 408.

In decision block 408, it is determined whether the user has found the URI of interest to the user. If the user has found the URI of interest to the user, the process proceeds to block 410.

In block 410, the user may select the URI of interest to the user to be displayed. The process then proceeds to block 412.

In block 412, the portable device connects to the Internet and loads the web content corresponding to the URI. If the web content contains new meta-data, the portable device may augment the stored URI reference with the new meta-data.

Returning to decision block 408, if it is determined that the user has not found the URI of interest to the user, the process proceeds back to block 404, where the user may issue a voice command using a different keyword.

In an embodiment where the keyword results in only one match, the portable device may directly connect to the Internet and load the web content corresponding to that URI.

Most NFC readers can emulate NFC tags to be read by other NFC readers. Thus, when a user enables its portable device to be automatically loaded with a URI from an NFC tag on an object, that portable device may also transfer the URI to other portable devices having an NFC reader. For example, a public kiosk in an airport may include a voice recognition interface coupled with a pre-loaded database of URIs of local hotels, transportation, restaurants, and other services. A user may speak the desired service name using the voice input of the kiosk to look up matching services. Once a service is selected by the user, the kiosk can load the URI of that service into its NFC reader. The user can then touch the NFC reader of their portable device to the NFC reader of the kiosk to read the data into their portable device. In this way, associated and up-to-date contact information such as, for example, phone numbers, web sites, directions, etc., can be easily loaded by the portable device via its Internet connection.

Figure 5:
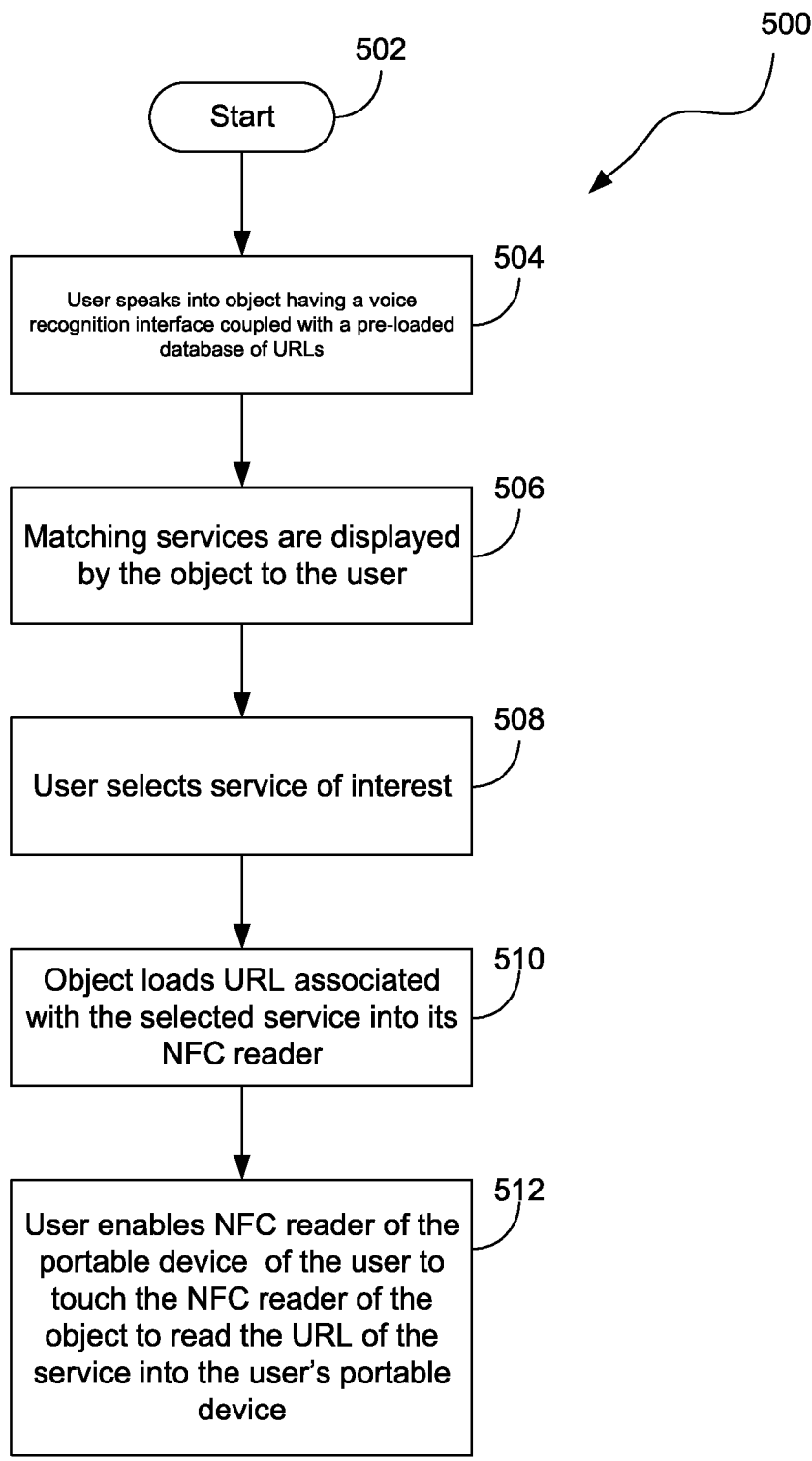
FIG. 5 is a flow diagram 500 illustrating an exemplary method for transferring information from one NFC reader to another NFC reader according to an embodiment of the present invention.

FIG. 5 is a flow diagram 500 illustrating an exemplary method for transferring information from one NFC reader to another NFC reader according to an embodiment of the present invention. The invention is not limited to the embodiment described herein with respect to flow diagram 500. Rather, it will be apparent to persons skilled in the relevant art(s) after reading the teachings provided herein that other functional flow diagrams are within the scope of the invention. The process begins at block 502, where the process immediately proceeds to block 504.

In block 504, a user speaks into an object having a voice recognition interface coupled with a pre-loaded database of URIs. The keyword spoken by the user is one of a plurality of desired services that the object has information about that may be retrieved by the user. The process proceeds to block 506.

In block 506, matching services are displayed by the object to the user. The process then proceeds to block 508.

In block 508, the user may select the service of interest to the user. The process then proceeds to block 510.

In block 510, the object may load the URI of that service into its NFC reader. The process then proceeds to block 512.

In block 512, the user may then enable the NFC reader of the portable device of the user to touch the NFC reader of the object to read the URI of the service into the portable device of the user.

Embodiments of the present invention may be implemented using hardware, software, or a combination thereof and may be implemented in one or more portable computer systems, as shown in FIG. 1, or other processing systems. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include at least one processor, a storage medium accessible by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

The invention claimed is:

1. A computing device for transferring Near Field Communications information comprising:
 a database to store information corresponding to a plurality of services, the information comprises a Universal Resource Identifier and content-specific keywords associated with each of the plurality of services;
 a voice recognition system to receive a voice input corresponding to a name of a requested service from the plurality of services, the voice recognition system to retrieve the Universal Resource Identifier and the content-specific keywords associated with the requested service from the database; and
 a Near Field Communications component to load the Universal Resource Identifier and the content-specific keywords associated with the requested service into a Near Field Communications tag emulated by the Near Field Communications component, the Near Field Communications component to transfer the Universal Resource Identifier and the content-specific keywords from the Near Field Communications tag to a portable computing device in response to the Near Field Communications tag being touched by a Near Field Communications reader of the portable computing device.

2. The computing device of claim 1, further comprising a display to display one or more of the plurality of services corresponding to the name of the requested service, the Near Field Communications component to load the Universal Resource Identifier and the content-specific keywords associated with a service selected from the plurality of services displayed into the Near Field Communications tag emulated by the Near Field Communications component.

3. The computing device of claim 1, wherein the plurality of services comprises one or more of a local hotel, a restaurant, or a transportation service.

4. The computing device of claim 1, wherein the information corresponding to the plurality of services comprises one or more of a phone number, a web site, or directions corresponding to one or more of the plurality of services.

5. A method for transferring Near Field Communications information comprising:
 storing, by a computing device, information corresponding to a plurality of services in a database on the computing device, the information comprises a Universal Resource Identifier and content-specific keywords associated with each of the plurality of services;

receiving, by the computing device, a voice input corresponding to a name of a requested service from the plurality of services;

retrieving, by the computing device, the Universal Resource Identifier and the content-specific keywords associated with the requested service from the database;

loading, by the computing device, the Universal Resource Identifier and the content-specific keywords associated with the requested service into a Near Field Communications tag emulated by a Near Field Communications component of the computing device; and transferring, by the computing device, the Universal Resource Identifier and the content-specific keywords from the Near Field Communications tag to a portable computing device in response to the Near Field Communications tag being touched by a Near Field Communications reader of the portable computing device.

6. The method of claim 5, further comprising:

receiving, by the portable computing device, the Universal Resource Identifier and the content-specific keywords from the Near Field Communications tag emulated by the computing device using the Near Field Communications reader of the portable computing device;

storing, by the portable computing device, the Universal Resource Identifier in memory of the portable computing device based on the content-specific keywords; and retrieving, by the portable computing device, the Universal Resource Identifier from the memory of the portable computing device in response to receiving a spoken keyword, the spoken keyword corresponding to one of the content-specific keywords stored in the memory.

7. The method of claim 5, further comprising:

displaying, by the computing device, one or more of the plurality of services corresponding to the name of the requested service; and receiving, by the computing device, a selection of one of the plurality of services displayed, wherein loading the Universal Resource Identifier and the content-specific keywords associated with the requested service into the Near Field Communications tag comprises loading the Universal Resource Identifier and the content-specific keywords associated with the selected service from the plurality of services displayed into the Near Field Communications tag.

8. The method of claim 5, wherein the plurality of services comprises one or more of a local hotel, a restaurant, or a transportation service.

9. The method of claim 5, wherein the information corresponding to the plurality of services comprises one or more of a phone number, a web site, or directions corresponding to one or more of the plurality of services.

10. A non-transitory machine-readable storage medium comprising a plurality of instructions stored thereon that in response to being executed result in a computing device:

storing information corresponding to a plurality of services in a database on the computing device, the information comprises a Universal Resource Identifier and content-specific keywords associated with each of the plurality of services;

receiving a voice input corresponding to a name of a requested service from the plurality of services;

retrieving the Universal Resource Identifier and the content-specific keywords associated with the requested service from the database;

loading the Universal Resource Identifier and the content-specific keywords associated with the requested service into a Near Field Communications tag emulated by a Near Field Communications component of the computing device; and transferring the Universal Resource Identifier and the content-specific keywords from the Near Field Communications tag to a portable computing device in response to the Near Field Communications tag being touched by a Near Field Communications reader of the portable computing device.

11. The non-transitory machine-readable storage medium of claim 10, wherein the plurality of instructions further result in the computing device:

displaying one or more of the plurality of services corresponding to the name of the requested service; and receiving a selection of one of the plurality of services displayed, wherein loading the Universal Resource Identifier and the content-specific keywords associated with the requested service into the Near Field Communications tag comprises loading the Universal Resource Identifier and the content-specific keywords associated with the selected service from the plurality of services displayed into the Near Field Communications tag.

12. The non-transitory machine-readable storage medium of claim 10, wherein the plurality of services comprises one or more of a local hotel, a restaurant, or a transportation service.

13. The non-transitory machine-readable storage medium of claim 10, wherein the information corresponding to the plurality of services comprises one or more of a phone number, a web site, or directions corresponding to one or more of the plurality of services.

14. A system for transferring Near Field Communications information comprising:

a computing device comprising:

a database to store information corresponding to a plurality of services, the information comprises a Universal Resource Identifier and content-specific keywords associated with each of the plurality of services;

a voice input to receive a spoken name of a requested service from the plurality of services;

a voice recognition interface to retrieve the Universal Resource Identifier and the content-specific keywords associated with the requested service from the database; and a Near Field Communications component to load the Universal Resource Identifier and the content-specific keywords associated with the requested service into an emulated Near Field Communications tag; and a portable computing device comprising:

a Near Field Communications reader to receive the Universal Resource Identifier and the content-specific keywords transferred from the Near Field Communications component of the computing device in response to the emulated Near Field Communications tag being touched by the Near Field Communications reader of the portable computing device;

a memory to store the Universal Resource Identifier based on the content-specific keywords; and a speech-recognition system to retrieve the Universal Resource Identifier from the memory of the portable computing device in response to receiving a spoken keyword, the spoken keyword corresponding to one of the content-specific keywords stored in the memory.

15. The system of claim 14, wherein the computing device further comprises a display to display one or more of the plurality of services corresponding to the name of the requested service,
    wherein to load the Universal Resource Identifier and the content-specific keywords associated with the requested service into the Near Field Communications tag comprises to load, into the Near Field Communications tag, the Universal Resource Identifier and the content-specific keywords associated with a service selected from the plurality of services displayed.

16. The system of claim 14, wherein the plurality of services comprises one or more of a local hotel, a restaurant, or a transportation service.

17. The system of claim 14, wherein the information corresponding to the plurality of services comprises one or more of a phone number, a web site, or directions corresponding to one or more of the plurality of services.

\* \* \* \* \*